Figure 1:
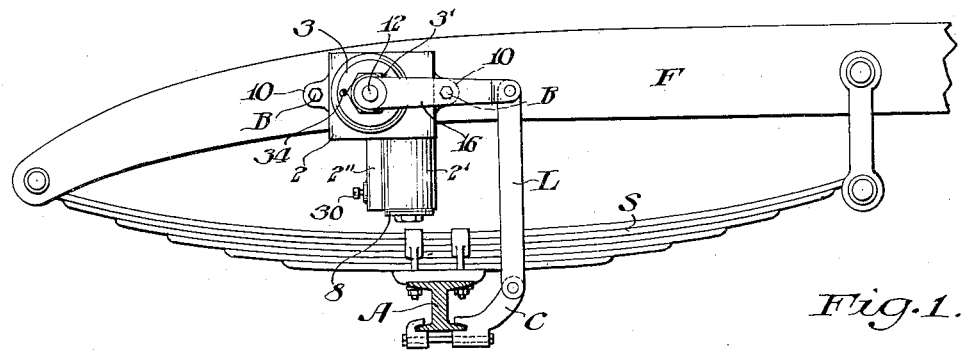

Aug. 10, 1926.  
H. S. WOODWARD  
HYDRAULIC SHOCK ABSORBER  
Filed May 19, 1924  
1,595,330

Inventor  
Herbert S. Woodward,  
By Blount & Hilbert  
Attorneys

Patented Aug. 10, 1926.

1,595,330

UNITED STATES PATENT OFFICE.

HERBERT S. WOODWARD, OF CARBONDALE, PENNSYLVANIA.

HYDRAULIC SHOCK ABSORBER.

Application filed May 19, 1924. Serial No. 714,233.

My invention relates to hydraulic shock absorbers for automotive or other vehicles, a principal object thereof being to provide a device adapted to afford a gradually increasing resistance to the forces which tend to cause the axle and frame of the vehicle to approach or separate when the vehicle is traveling over an uneven surface and thus regulate and control the action of the vehicle springs. Further objects of the invention are to provide an hydraulic shock absorber adapted to exert substantially the same resistance and opposition to a given movement of separation between the frame and axle of the vehicle as to a similar movement of approach or, in other words, an hydraulic shock absorber which will exert substantially the same resistance in opposition to a given relative downward movement of the frame with respect to the axle from normal position as to the same relative movement of the frame upward with respect to the axle, thus controlling the action of the springs both during their initial compression and ensuing rebound. A still further object of the invention is to provide an hydraulic shock absorber embodying means for constantly maintaining a given quantity of the fluid medium in operative association with a movable piston, so that once the parts have been adjusted to provide a given resistance for a given spring compression or rebound, the subsequent operation of the device, until another adjustment is effected, will be substantially constant irrespective of any leakage of fluid which, in the absence of said means, might tend by diminishing the quantity of fluid in association with the piston to vary the action of the shock absorber.

Still further objects of the invention are to provide a shock absorber embodying the foregoing characteristics which is simple in design and construction, not liable to get out of order under operative conditions, embodies means for varying the amount of resistance afforded under given operative conditions thereby enabling adjustment to obtain the most satisfactory operative results on different automobiles or adjustment to accord with the particular desires of the owner and which is compact, adapted for convenient attachment to different makes of automobiles and which, when so attached, presents a neat and attractive appearance.

The invention further includes such other objects and novel features of design, construction and arrangement as may hereinafter be more specifically mentioned or which will be apparent from the accompanying drawing forming a part hereof.

To enable those skilled in the art to comprehend and practice the invention, I have illustrated in the said drawing and shall now proceed to describe a form thereof suitable for attachment to an automobile of modern type but it will be understood I do not thereby desire or intend to limit the invention to the precise embodiment shown or to any specific manner of attaching the device to the vehicle as such attachment may be made in any suitable way by any convenient means.

Figures 2, 3, 5:
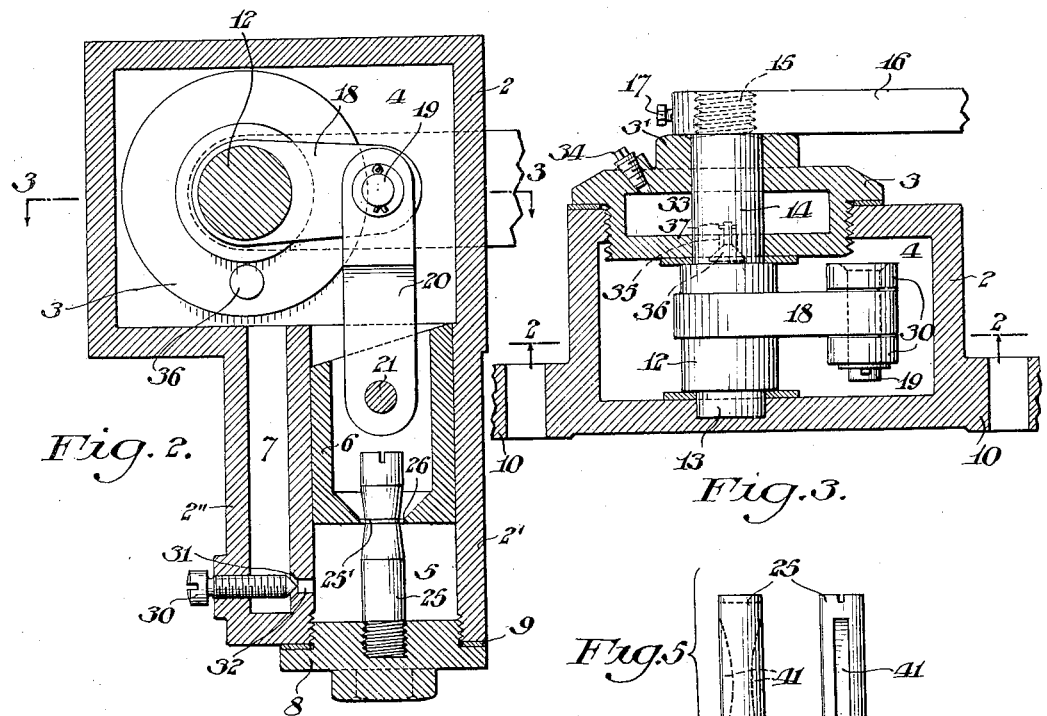
Figure 4:
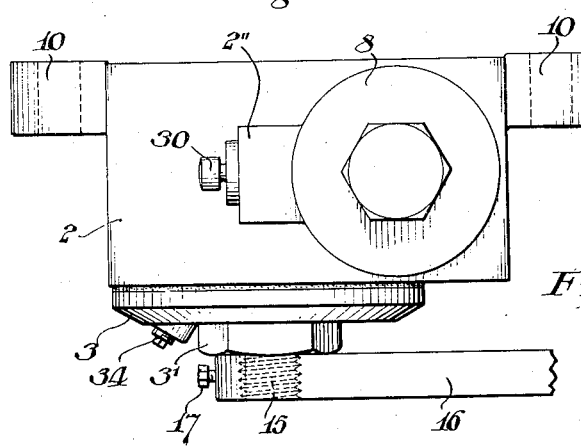

Referring now to the drawing Fig. 1 is a view in side elevation showing the shock absorber operatively attached to an automobile. Fig. 2 is an enlarged vertical section of the shock absorber removed from the automobile and taken on line 2—2 of Fig. 3 looking in the direction of the arrows and with certain parts shown in elevation; Fig. 3 is a transverse section on line 3—3 in Fig. 2 also with certain parts shown in elevation and Fig. 4 is a bottom plan view of the device. Fig. 5 is a composite detail view showing one of the elements of the shock absorber in a modified form. Like numerals are used to indicate the same parts in the several figures.

As best shown in Figs. 2, 3 and 4 my invention in its preferred embodiment comprises a hollow casing or housing 2 of substantially rectangular cross section and to the interior of which access may be gained through a cylindrical interiorly threaded opening in one side which, in the assembled device, is closed by a cap 3 hereinafter more fully described. The housing thus affords an interior crank chamber 4 and is also provided with a substantially cylindrical depending portion 2' forming a hollow cylinder 5 in which is slidably disposed a hollow piston 6. The housing is also provided with a by-pass passage 7 which may be formed in the wall of the housing adjacent the cylinder and communicates at one end with the chamber 4, the other end being closed by the housing wall. Conveniently this passage may be cored in a vertically extending rib 2" integral with the housing wall and disposed parallel to the portion 2' and forming a part thereof, it being understood that the housing, together with the depending part 2' and the rib 2'' are preferably cast integral as a single unit and the interior of the cylinder 5 thereafter suitably machined for the reception of the piston; the interior of the chamber 4 and of the passage 7 need not, however, be machined or otherwise finished. The lower end of the cylinder 5 is operatively closed by a removable flanged plug 8 which is screwed into the end of the cylinder against a gasket 9 thus forming a fluid tight joint although if desired the abutting surfaces of the plug and the housing may be ground so as to form a fluid tight joint without the use of the gasket. The main portion of the housing may also be provided with integral lugs 10—10 suitably bored for the passage of bolts for attaching the device to the frame of the vehicle.

Means are provided for so connecting the piston as to produce reciprocation thereof in the cylinder in correspondence with the relative movements of approach or separation of the frame and axle of the vehicle to which the shock absorber is attached, said means comprising a shaft or crank pin 12 one end of which 13 may be slightly reduced in diameter and journaled for oscillation in a depression formed in that wall of the housing opposite the cap 3, while the other end 14 of the shaft, also preferably slightly reduced in diameter, is adapted to extend through and be supported for oscillation or journaled in a bore of suitable size formed centrally in the cap; the latter may be provided with a hexagonal portion 3' adapted for the reception of a wrench to enable the cap to be firmly screwed to its seat in the housing. The extremity of the shaft is arranged to project beyond the cap and may be provided with threads 15 for the reception of corresponding threads formed in a hole at one end of an arm 16 which is thereby secured on the shaft in such position as to extend substantially horizontally when the piston 6 is at the center of its path, a set screw 17, pin or other suitable means being employed to insure operative rigidity between the arm and the shaft.

The shaft is provided near its center and preferably in alignment with the axis of the cylinder 5 with an arm or crank 18 preferably integral with the shaft and having its free extremity connected by a pin 19 with one end, preferably bifurcated, of a link or connecting rod 20 whose opposite or lower end is mounted for oscillation on a piston pin 21 disposed in the interior of the hollow piston with its ends extending into the walls thereof whereby oscillation of the shaft is effective to reciprocate the piston in the cylinder.

Under operative conditions the chamber 4, cylinder 5 and passage 7 are maintained full of oil or other suitable fluid and means now to be described are provided for causing a progressively increasing resistance to the movement of the piston in either direction from its normal position as shown in Fig. 2 by causing the fluid on one side of the piston to pass to the other side thereof through an opening whose area is progressively reduced in correspondence with the length of the path through which the piston moves. More specifically and to attain this result I may mount a pin 25 on the plug 8 so as to extend axially of the cylinder, the lower end of the pin being conveniently threaded and screwed into an interiorly threaded bore in the plug so as to maintain the pin in rigid operative relation therewith. This pin is of sufficient length to extend through the head of the piston which is provided with a central aperture 26 for this purpose, the shape of the aperture preferably conforming to the pin. Thus, if the latter is of circular cross section the aperture will preferably be circular, but should the pin be of other cross sectional shape the form of the aperture will ordinarily be correspondingly modified. When the pin is cylindrical, as shown, the diameter of the aperture in the piston is preferably such as to form a good working fit on the upper and lower portions of the pin which latter, however, between said portions is somewhat reduced in diameter with the point 25' of greatest reduction disposed substantially on alignment with the head of the piston when the latter is in normal position, that is, at the center of its stroke or path. From this point the surface of the pin is outwardly inclined in opposite directions to meet the upper and lower cylindrical portions so that in effect the surface of the pin between said portions conforms to two frustrated cones abutting at their smaller ends. It will thus be apparent that when the piston, the head of which adjacent the aperture 26 may preferably be reduced in thickness so as to diminish the length of the wall of the aperture, is at the center of its stroke, the maximum effective area of the aperture will be presented, and that as the piston moves either up or down the effective area of the aperture will be gradually diminished until the head of the piston reaches either the cylindrical portion of the pin which thereafter during further movement of the piston substantially fills the aperture, while during movement of the piston from either end of its stroke toward the opposite end thereof, the effective area of the aperture, after the piston passes off of the cylindrical portion of the pin, will be gradually increased until the piston reaches the center of its stroke and thereafter gradually diminished as the opposite end thereof is approached. Under these conditions and assuming the housing to be completely filled with oil, glycerin or other substantially noncompressible fluid, it will be evident that as the piston moves from normal position the fluid displaced from that side of the piston toward which it is moving can at first flow rather freely through the aperture to the opposite side of the piston but as the movement of the piston is prolonged and the effective area of the aperture correspondingly decreased, the flow of fluid is correspondingly retarded so that a progressively greater resistance to the movement of the piston is presented until the latter finally passes onto the cylindrical portion of the pin and thus prevents substantially any further flow of the fluid through the aperture thereafter. On the return movement of the piston an opposite effect is produced by the gradual enlargement of the effective area of the aperture, thus gradually diminishing the fluid resistance to the movement of the piston until the latter attains normal position from which point should the piston move beyond the same a progressively increasing resistance is again set up.

As a considerable body of fluid is displaced by any material movement of the piston from normal position, I prefer to provide the by-pass passage to which reference has hitherto been made to enable a certain amount of the displaced fluid to pass from one side of the piston to the other in a manner other than through the aperture 26, and for regulating this amount I may provide adjusting means conveniently in the form of a needle valve comprising a screw 30 having a conical point and extending through the wall 2' to cooperate with a seat 31 adjacent a small port 32 extending between the lower end of the cylinder 5 and the by-pass passage 7; thus by adjusting the needle valve the effective area of the port may be increased or diminished so as to control the amount of fluid which can flow therethrough on a given movement of the piston. In consequence, as the effective area of the port is increased the amount of fluid which, on a given piston movement, is constrained to flow through the aperture 26 is diminshed and vice versa, and I am thus enabled to vary by suitable adjustment of the needle valve, the amount of resistance which will be imparted to a given movement of the arm 16 and, in turn, when the shock absorber is connected to a vehicle, the amount of resistance which will be exerted against a given relative movement of the frame and axle thereof.

In devices of this general character it is difficult, if not impossible, to prevent a certain loss of fluid through leakage, evaporation or other causes, which is, of course, inimical to the satisfactory operation of the shock absorber as it results in the gradual diminution of the resistance exerted thereby, and an important feature of my invention therefore is the provision of means for automatically maintaining a constant quantity of the fluid in operative association with the piston. To this end I provide a suitable fluid reservoir and means for automatically feeding fluid therefrom to the interior of the housing so as to immediately replace any loss of fluid therefrom as soon as the same occurs; thus I may form within the cap 3 a reservoir 33 which may be filled when required by removing a filler plug 34 disposed in the wall of the cap. The reservoir 33 communicates through a port 35 in the inner wall of the cap with the interior of the housing, this port being controlled by a valve 36 of suitable design, that shown having a conical head seating on a seat formed at the inner end of the port and a stem slidably projecting through the port into the reservoir and prevented from withdrawal by a pin 37 extending transversely through the stem, but any other suitable form of valve may be employed if desired so long as the same is adapted to permit fluid to pass from the reservoir to the chamber but prevent its return from the chamber to the reservoir.

Under these conditions it will be apparent that upon a loss of fluid from the interior of the housing and consequent formation of a partial vacuum therein, the valve 36 on the next ensuing movement of the piston will open and permit a sufficient quantity of fluid to be drawn from the reservoir to replace the loss but by reason of its construction will at all times prevent a reverse flow of fluid from the housing to the reservoir. Thus a constant quantity of fluid is at all times maintained in the housing in operative association with the piston thereby preventing any variations in the action of the shock absorber and the amount of resistance exerted thereby.

In Fig. 5 I have shown a slightly modified form of pin which may be used advantageously under certain conditions in place of the form of pin hitherto described. This pin, instead of having oppositely inclined conical surfaces to form a graduated reduced area, is of cylindrical contour throughout and is provided with one or more longitudinally extending slots 41, milled or otherwise formed in the pin, and having their bottoms curved so that the slots are of greatest depth at the point which is aligned with the head of the piston when the latter is in normal position from which point the slots gradually decrease in depth in either direction and finally terminate at a suitable distance from the top and bottom of the pin. It will be apparent that when a pin of this construction is employed, the fluid can pass quite freely through the slots from one side of the piston to the other when the latter is near its normal position but as the piston moves so that its head approaches one end or the other of the pin, the effective area of the slots is gradually decreased so as to correspondingly retard the passage of the fluid.

In practice, the housings of my improved shock absorber will ordinarily be constructed in rights and lefts so as to permit the convenient attachment of the device to the opposite sides of the vehicle frame and any suitable means may be provided for effecting the connection between the axle of the vehicle and the free end of the arm 16. In Fig. 1 I have shown one of the shock absorbers in operative position on a vehicle frame F, the shock absorber being secured thereto by bolts B extending through the lugs 10 and the arm 16 being connected by means of a link L with a clamp C disposed on the axle A between which and the frame is arranged a spring S in the usual manner. As is well known a certain amount of lateral motion or shifting occurs between the frame and axle of a motor car under operative conditions and it is thus desirable to so arrange the connection between the end of the lever arm 16 and the axle that this normal motion of the parts will not be restricted and will not effect the operation of the shock absorber and I therefore may make the link of a strip of spring steel or other metal so that the link will be able to bend or give slightly in a lateral direction when required, but any other means for accomplishing the same result may be employed if desired, as the manner of effecting the requisite connection between the arm and the axle or other portion of the vehicle relatively movable to that to which the housing is secured forms no part of the present invention.

While I have herein described and illustrated one form of my invention with considerable particularity, I do not thereby desire or intend to in any manner limit myself to any precise details in the design, construction or arrangement of the various elements of the device, as suitable modifications may be made therein if desired without departing from the spirit and scope of the invention as defined in the appended claims.

Having thus described my invention, I claim and desire to protect by Letters Patent of the United States:

1. In a shock absorber of the class described, the combination of a housing providing a chamber and a cylinder communicating therewith, said cylinder and chamber being adapted to be completely filled with fluid, a piston having an aperture in its head and movable in said cylinder, an arm disposed without the casing, mechanism connecting said arm and said piston whereby a movement of the arm is operative to move the piston, a pin fixed with respect to the housing and extending through said aperture in the piston head and having portions of different diameter whereby the effective area of said aperture is varied as the piston aligns with different points on the pin, and a by-pass passage extending from one end of the cylinder to the chamber to provide a passage auxiliary to said aperture for the movement of fluid when the piston moves in the cylinder.

2. In a shock absorber of the class described, the combination of an operatively closed housing providing a chamber and a cylinder communicating therewith, a piston in said cylinder having an aperture in its head, an arm exterior of the housing, means connecting the arm with the piston whereby movement of the arm is operative to reciprocate the piston in the cylinder, a pin having portions of different diameters fixed with respect to the housing and extending through said aperture whereby as the piston is moved relatively to the pin the effective area of the aperture is varied, a by-pass passage extending from one side of the piston to the other, and means for adjusting the effective area of said passage.

3. In a shock absorber of the class described, the combination of a housing providing a chamber, a cylinder and a by-pass passage connecting one end of the cylinder with said chamber, a piston disposed for reciprocation in said cylinder, an arm exterior of the housing, means connecting said arm and said piston whereby movement of the arm is operative to reciprocate the piston, a fluid reservoir adjacent but separate from the chamber, and means for permitting the flow of fluid from said reservoir to the chamber but operative to prevent flow of fluid in the reverse direction.

4. In a shock absorber of the class described, the combination of a housing providing a chamber, a cylinder communicating therewith and a by-pass passage extending from one end of the cylinder to the chamber, said chamber, cylinder and passage being completely filled with fluid, a piston having an aperture in its head and disposed for reciprocation in the cylinder, an arm exterior of the housing, means connecting said arm and said piston whereby movement of the arm is operative to reciprocate the piston, a pin having parts of different diameters extending through said aperture, means for restricting the effective area of the by-pass passage, means for maintaining a body of fluid separate from the fluid in the housing, and a valve operative to permit said separate fluid to pass into said housing as required to maintain the same entirely full.

5. In a shock absorber of the class described, the combination of a housing providing a crank chamber, a cylinder communicating therewith at one end and closed at the other end and a by-pass passage extending from adjacent said closed end to said crank case, said housing having an opening in its wall, a piston having an aperture in its head and disposed for reciprocation in said cylinder, an arm exterior of the housing, means connecting said arm and said piston whereby movement of the arm is operative to reciprocate the piston, a pin having portions of different diameters fixed with respect to the housing and extending through said aperture, means for controlling the effective area of the by-pass, a removable cap for closing the opening in the wall of the housing, said cap having an interior chamber forming a fluid reservoir, a port extending from said reservoir through the wall of the cap and opening into said chamber when the cap is in position in said opening, a valve controlling said port and adapted to permit fluid to flow from the reservoir into the chamber and to prevent flow from the chamber to the reservoir, and means for introducing fluid into the reservoir.

6. In a shock absorber of the class described, the combination of an operatively closed housing providing a chamber and a cylinder communicating therewith, a piston in said cylinder having an aperture in its head, an arm exterior of the housing, means connecting the arm with the piston whereby movement of the arm is operative to reciprocate the piston in the cylinder, a pin having portions of different diameters fixed with respect to the housing and extending through said aperture whereby as the piston is moved relatively to the pin the effective area of the aperture is varied, and a by-pass passage extending from one side of the piston to the other.

In witness whereof, I have hereunto set my hand this 15th day of May, 1924.

HERBERT S. WOODWARD.